US012234978B2

(12) United States Patent
Pan et al.

(10) Patent No.: US 12,234,978 B2
(45) Date of Patent: Feb. 25, 2025

(54) WATER-COOLED HIGH-POWER LED MODULE

(71) Applicant: SHENZHEN LEAFLIFE TECHNOLOGY CO., LTD., Guangdong (CN)

(72) Inventors: Shaohui Pan, Guangdong (CN); Yaoshun Hong, Guangdong (CN)

(73) Assignee: SHENZHEN LEAFLIFE TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/039,819

(22) PCT Filed: Sep. 23, 2022

(86) PCT No.: PCT/CN2022/120695
§ 371 (c)(1),
(2) Date: Jun. 1, 2023

(87) PCT Pub. No.: WO2024/031794
PCT Pub. Date: Feb. 15, 2024

(65) Prior Publication Data

US 2024/0302033 A1 Sep. 12, 2024

(30) Foreign Application Priority Data

Aug. 8, 2022 (CN) ......................... 202210941675.0

(51) Int. Cl.

| | |
|---|---|
| ***F21V 29/503*** | (2015.01) |
| ***F21V 23/00*** | (2015.01) |
| ***F21V 29/58*** | (2015.01) |
| ***F21V 29/89*** | (2015.01) |
| ***F21V 31/00*** | (2006.01) |

(Continued)

(52) U.S. Cl.
CPC ............ *F21V 29/58* (2015.01); *F21V 23/002* (2013.01); *F21V 29/503* (2015.01); *F21V 29/89* (2015.01); *F21V 31/005* (2013.01); *F21Y 2113/00* (2013.01); *F21Y 2115/10* (2016.08)

(58) Field of Classification Search
CPC ........ F21V 29/503; F21V 29/50; F21V 29/56; F21V 29/58; F21V 31/005; F21V 23/001
See application file for complete search history.

(56) References Cited

U.S. PATENT DOCUMENTS 6,474,074 B2 * 11/2002 Ghoshal .............. F28D 15/0233 165/104.21
7,157,838 B2 * 1/2007 Thielemans .......... G09F 9/3026 313/45

(Continued)

FOREIGN PATENT DOCUMENTS

CN 101612452 A 12/2009
CN 102130421 A 7/2011

(Continued)

*Primary Examiner* — Ismael Negron

(57) ABSTRACT

An LED module includes a base, a rear plate, an LED chip board and a glass window. The back surface of the base includes a channel for introducing cooling water. A sealing ring is compressed between the back surface of the base and the rear plate to seal the channel. A plurality of LED chips connected in series form the LED chip board which is mounted on the front surface of the base and is covered with the glass window.

11 Claims, 2 Drawing Sheets

(51) Int. Cl.
*F21Y 113/00* (2016.01)
*F21Y 115/10* (2016.01)

(56) References Cited

U.S. PATENT DOCUMENTS

| | | | | |
|---|---|---|---|---|
| 8,096,348 | B2 * | 1/2012 | Takagi | F28D 9/0043 165/170 |
| 8,247,956 | B2 * | 8/2012 | Liu | F21V 29/51 313/34 |
| 8,419,249 | B2 * | 4/2013 | Yatsuda | F21V 29/58 313/45 |
| 8,430,521 | B2 * | 4/2013 | Hui | F21V 29/58 362/264 |
| 9,488,359 | B2 * | 11/2016 | Le | F21V 29/59 |
| 9,622,380 | B1 * | 4/2017 | Joshi | H05K 7/20327 |
| 9,632,294 | B2 * | 4/2017 | Dahm | F21V 29/51 |
| 10,113,735 | B2 * | 10/2018 | Emerson | F21V 29/67 |
| 10,378,750 | B2 * | 8/2019 | Rebiffe | F21V 29/58 |
| 10,578,293 | B2 * | 3/2020 | Kadijk | F21V 29/58 |
| 11,333,342 | B2 * | 5/2022 | Edwards | F21V 29/58 |
| 2007/0189012 | A1 * | 8/2007 | Huang | F21V 29/56 362/294 |
| 2007/0272399 | A1 * | 11/2007 | Nitta | F28D 15/046 165/185 |
| 2008/0105413 | A1 * | 5/2008 | Peng | F28F 13/185 165/104.33 |
| 2008/0205034 | A1 * | 8/2008 | Kunkel | F21V 3/049 362/101 |
| 2010/0134017 | A1 * | 6/2010 | Yatsuda | F21V 29/57 315/113 |
| 2011/0037390 | A1 * | 2/2011 | Ko | F21V 29/59 315/117 |
| 2011/0073159 | A1 * | 3/2011 | Shen | F21V 29/58 165/104.34 |
| 2011/0188203 | A1 * | 8/2011 | Smith | F21V 29/58 361/720 |
| 2013/0242592 | A1 * | 9/2013 | Foo | F21V 29/58 362/547 |
| 2017/0167712 | A1 * | 6/2017 | Melzner | F21V 29/57 |
| 2023/0129185 | A1 * | 4/2023 | Pan | A61B 18/203 606/2 |

FOREIGN PATENT DOCUMENTS

| | | | |
|---|---|---|---|
| CN | 103836409 | A | 6/2014 |
| CN | 107174751 | A | 9/2017 |
| CN | 214342588 | U | 10/2021 |
| FR | 3077210 | A1 | 8/2019 |

* cited by examiner

WATER-COOLED HIGH-POWER LED MODULE

CROSS-REFERENCE TO RELATED APPLICATIONS

This application is a U.S. National Stage of International Application No. PCT/CN2022/120695, filed Sep. 23, 2022, which claims the benefit of and priority to Chinese Patent Application No. 2022109416750, filed Aug. 8, 2022, each of which is hereby incorporated by reference herein in its entirety.

TECHNICAL FIELD

The present disclosure relates to the technical field of hair removal equipment, in particular to a high-power light-emitting diode (LED) light source module with optimized heat dissipation.

BACKGROUND

Laser hair removal technology refers to permanent/semi-permanent removal of excess hair by optical thermal effect, and has a history of more than twenty years. The basic principle of laser hair removal technology is that hair and hair follicles are richer in melanin and lower in heat dissipation capacity than skin. Through the selective absorption of light by different tissues and different thermal relaxation time, and the hair removal effect of heating hair and hair follicles to be de deactivated and died is achieved, but other parts of the skin are basically harmless.

In the existing laser hair removal technology, various forms of light sources, such as pulsed gas lamps, pulsed/long-pulsed solid-state lasers, semiconductor lasers and LED light sources, can be selected. The LED light source, as a surface light source, is low in heat flux, high in heat dissipation efficiency and low in probability of overheating and burning, and has the characteristics of long service life and high reliability. Moreover, the LED light source emits light in a near-infrared band. The LED light source is slight in absorption of skin tissue and blood vessels and strong in absorption of hair (follicles) and melanin, and has a certain width of spectrum. The LED light source is suitable for various skin colors, is good in hair removal effect, uniform in light spot distribution, free of tingling sensation, low in maximum local brightness, little in damage to eyes and convenient in operation for frontline personnel. Because of the above advantages, the laser hair removal technology using the LED as a light source has been widely used increasingly.

At present, laser hair removal equipment using the LED as a light source still has some problems, such as inconvenience in operation and poor cooling effect, resulting in poor hair removal effect or skin scald. Therefore, the equipment has potential safety hazards and is poor in user experience, and the effect achieved by the product cannot meet the needs of the market and users.

SUMMARY

The present disclosure aims to provide a high-power LED light source module with optimized heat dissipation so as to solve the problems existing in the prior art. The maximum heat flux density, heat resistance and temperature gradient of the light source are greatly improved, and the requirement on refrigeration is reduced. Meanwhile, fatigue damage to welding caused by thermal stress during long-pulse-width repeated frequency working is reduced, the reliability of the light source is improved, and the service life of the light source is prolonged.

In order to achieve the above purpose, the present disclosure provides the following scheme. The present disclosure provides a high-power LED light source module with optimized heat dissipation, including:

- a base, a water channel being formed in the back surface of the base, and cooling water being connected into the water channel;
- a rear plate, the back surface of the base being equipped with the rear plate, and the rear plate being used for pressing and sealing a sealing ring and the water channel;
- an LED chip board, the LED chip board being directly brazed on the front surface of the base and including a plurality of LED chips which are welded in series with gold wires;
- positive and negative electrodes, insulators being arranged at the bottom of the base, the front ends of the positive and negative electrodes being connected with the LED chip by welding through gold wires after respectively passing through the insulators, and the rear ends of the positive and negative electrodes being welded with a wire welding plate which is used for welding wires; and
- a glass window, the front surface of the base being located on the outer side of the LED chip board and provided with the glass window by sealing.

In one of the embodiments, the base is made of copper and gold-plated materials.

In one of the embodiments, the water channel is distributed in a snake shape, and a plurality of concave points are machined in the water channel.

In one of the embodiments, a beryllium oxide ceramic heat sink is adopted as a substrate of the LED chip, and the substrate is coated with an artificial diamond film coating.

In one of the embodiments, the glass window is fixed with the base by glue.

In one of the embodiments, an air suction hole and an air filling hole are formed in the base, and the air suction hole is used for connecting air suction equipment and pumping out air in the cavity between the base and the glass window; and during vacuumizing, the air filling hole is sealed and closed, and the air suction hole is sealed after vacuumizing is completed through air suction hole.

In one of the embodiments, the air filling hole is used for connecting a nitrogen source and filling nitrogen into the cavity between the base and the glass window; and when nitrogen is filled, the air suction hole is sealed and closed, and the air filling hole is sealed after nitrogen is filled through the air filling hole.

In one of the embodiments, an air suction and filling hole is formed in the base, the air suction and filling hole is used for connecting air suction equipment and pumping out air in the cavity between the base and the glass window, and the air suction and filling hole is also used for connecting a nitrogen source and filling nitrogen into the cavity between the base and the glass window.

In one of the embodiments, the LED chips are all square chips, and the LED chip board is formed by series welding of gold wires, and the shape of the LED chip board is matched with the front opening of the base.

Compared with the prior art, the present disclosure has the following beneficial technical effects.

The high-power LED light source module with optimized heat dissipation includes a base, a rear plate, an LED chip board and a glass window. The base is a carrier of the whole light source module. A water channel for introducing cooling water is formed in the back surface of the base. The water channel and the rear plate are pressed and sealed through a sealing ring. A plurality of LED chips connected in series form the LED chip board to be installed on the front surface of the base. Finally, the front surface of the whole base is sealed with the glass window. According to the high-power LED light source module with optimized heat dissipation, the high-power LED chip serves as a near-infrared light source to replace a traditional edge-emitting laser (EEL) semiconductor laser. The main parameters, such as wavelength, practical effect, power density and electro-optical conversion efficiency, of the high-power LED chip are basically consistent with those of the traditional EEL semiconductor laser. However, a vertical heat transfer mode is adopted to replace a horizontal heat transfer mode, and square chip cutting is adopted to replace long-strip-shaped chip cutting, so that the maximum heat flux density, heat resistance and temperature gradient of the light source are greatly improved, and the requirement (the minimum temperature needs to be higher than 10° C.) on refrigeration is reduced. In daily use, natural heat dissipation can be used, and refrigeration below ambient temperature is unnecessary. Meanwhile, fatigue damage to welding caused by thermal stress during long-pulse-width repeated frequency working is reduced, the reliability of the light source is improved, and the service life of the light source is prolonged.

BRIEF DESCRIPTION OF THE DRAWINGS

To more clearly illustrate the embodiment of the present disclosure or the technical scheme in the prior art, the following briefly introduces the attached figures to be used in the embodiment. Apparently, the attached figures in the following description show merely some embodiments of the present disclosure, and those skilled in the art may still derive other drawings from these attached figures without creative efforts.

REFERENCE SIGNS

1, glass window; 2, LED chip; 3, base; 4, sealing ring; 5, rear plate; 6, wire welding plate; 7, positive and negative electrodes; 8, insulator; and 9, air suction and filling hole.

DETAILED DESCRIPTION OF THE EMBODIMENTS

The following clearly and completely describes the technical scheme in the embodiments of the present disclosure with reference to the attached figures in the embodiments of the present disclosure. Apparently, the described embodiments are merely a part rather than all of the embodiments of the present disclosure. Based on the embodiment in the present disclosure, all other embodiments obtained by the ordinary technical staff in the art under the premise of without contributing creative labor belong to the scope protected by the present disclosure.

The present disclosure aims to provide a high-power LED light source module with optimized heat dissipation so as to solve the problems existing in the prior art. The maximum heat flux density, heat resistance and temperature gradient of the light source are greatly improved, and the requirement on refrigeration is reduced. Meanwhile, fatigue damage to welding caused by thermal stress during long-pulse-width repeated frequency working is reduced, the reliability of the light source is improved, and the service life of the light source is prolonged.

To make the foregoing objective, features and advantages of the present disclosure clearer and more comprehensible, the present disclosure is further described in detail below with reference to the attached figures and specific embodiments.

Figure 1:
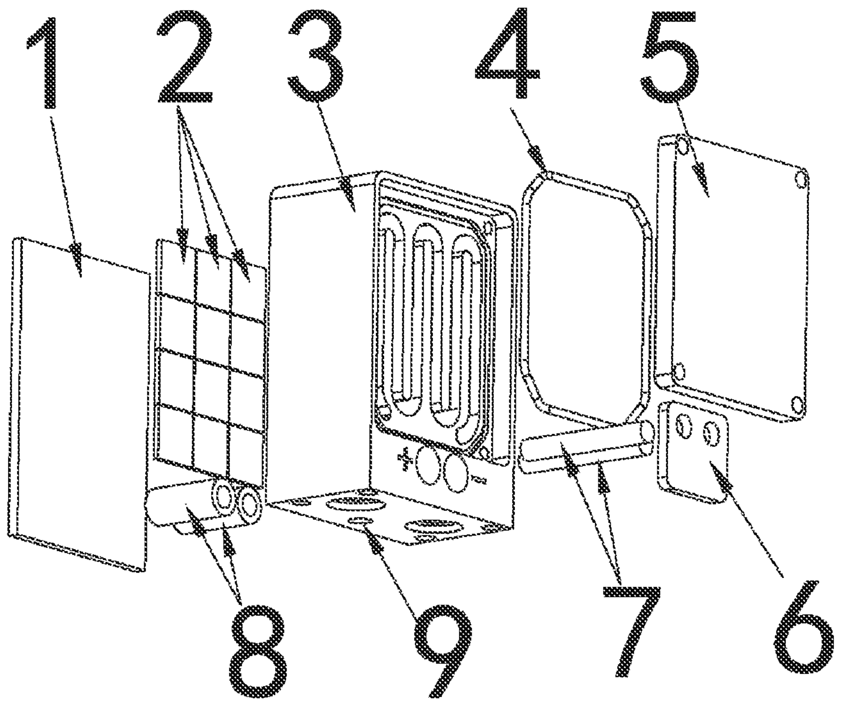
FIG. 1 is a structural spilt diagram of a high-power LED light source module with optimized heat dissipation in the embodiment of the present disclosure.
Figure 2:
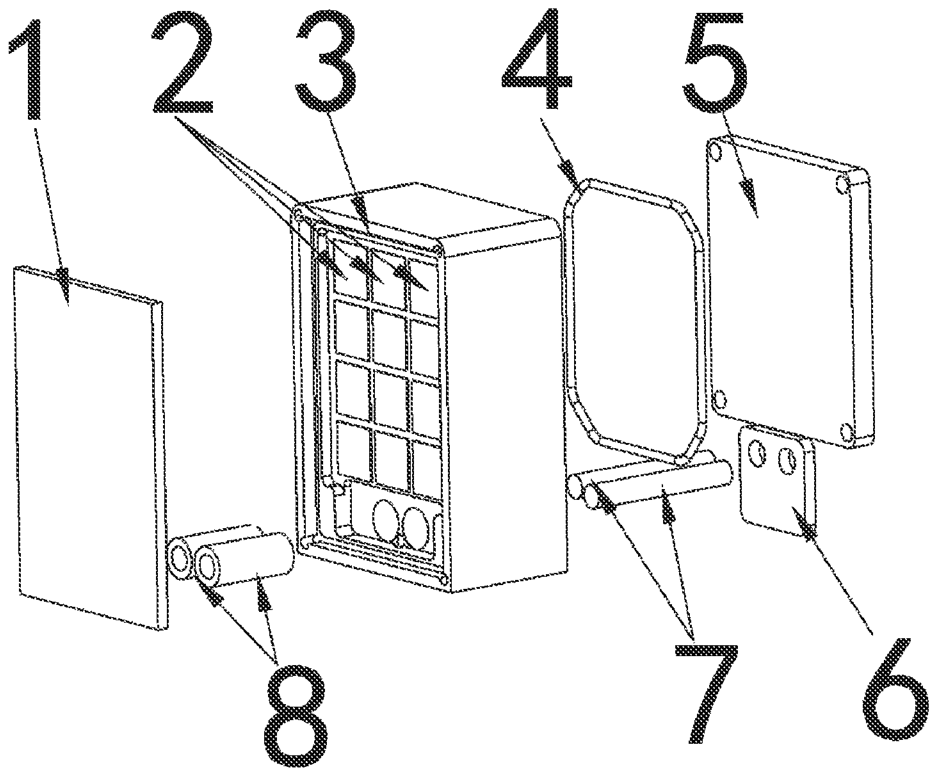
FIG. 2 is a structural schematic diagram of LED chips assembled on a base in the embodiment of the present disclosure.

As shown in FIG. 1 and FIG. 2, the present disclosure provides a high-power LED light source module with optimized heat dissipation, including:

a base 3, a water channel being formed in the back surface of the base 3, and cooling water being connected into the water channel;

a rear plate 5, the back surface of the base 3 being equipped with the rear plate 5, and the rear plate 5 being used for pressing and sealing a sealing ring 4 and the water channel;

an LED chip board, the LED chip board being directly brazed on the front surface of the base 3 and including a plurality of LED chips 2 which are welded in series with gold wires;

positive and negative electrodes 7, insulators 8 being arranged at the bottom of the base 3, the front ends of the positive and negative electrodes 7 being connected with the LED chip 2 by welding through gold wires after respectively passing through the insulators 8, and the rear ends of the positive and negative electrodes 7 being welded with a wire welding plate 6 which is used for welding wires; the positive and negative electrodes 7 pass through the insulators 8 to be fixed to the base 3, and the wire welding plate 6 is welded with the positive and negative electrodes 7 to facilitate the welding of wires; and a glass window 1, the front surface of the base 3 being located on the outer side of the LED chip board and provided with the glass window 1 by sealing.

In one of the embodiments, the base 3 is made of copper and gold-plated materials with good heat conduction.

In one of the embodiments, a winding water channel is formed in the back surface of the base 3, and concave points similar to horseshoe prints are machined in the channel. The function of the concave points is to enhance the heat exchange efficiency of cooling water. After the sealing ring 4 is installed at the water channel, the water channel is tightly sealed with the rear plate 5.

In one of the embodiments, the LED chip 2 is made of ultra-thin beryllium oxide ceramic heat sink (0.1 mm) and supplemented by an artificial diamond film coating, and the high-power and large-size LED light source is directly brazed on the base 3 to achieve high-efficiency heat dissipation for the chip.

In one of the embodiments, the glass window 1 and the base 3 are fixed together with glue, internal air is pumped out through the air suction and filling hole, nitrogen is filled, and then the air suction and filling hole is sealed.

In one of the embodiments, an air suction hole and an air filling hole are formed in the base 3, and the air suction hole is used for connecting air suction equipment and pumping out air in the cavity between the base 3 and the glass window

1; and during vacuumizing, the air filling hole is sealed and closed, and the air suction hole is sealed after vacuumizing is completed through air suction hole. The air filling hole is used for connecting a nitrogen source and filling nitrogen into the cavity between the base 3 and the glass window 1; and when nitrogen is filled, the air suction hole is sealed and closed, and the air filling hole is sealed after nitrogen is filled through the air filling hole.

In one of the embodiments, an air suction and filling hole 9 is formed in the base 3, the air suction and filling hole 9 is used for connecting air suction equipment and pumping out air in the cavity between the base 3 and the glass window 1, and the air suction and filling hole 9 is also used for connecting a nitrogen source and filling nitrogen into the cavity between the base 3 and the glass window 1.

In one of the embodiments, the LED chips 2 are all square chips, and the LED chip board is formed by series welding of gold wires, and the shape of the LED chip board is matched with the front opening of the base 3.

According to the high-power LED light source module with optimized heat dissipation, the high-power LED chip serves as a near-infrared light source to replace a traditional edge-emitting laser (EEL) semiconductor laser. The main parameters, such as wavelength, practical effect, power density and electro-optical conversion efficiency, of the high-power LED chip are basically consistent with the traditional EEL semiconductor laser. However, a vertical heat transfer mode is adopted to replace a horizontal heat transfer mode, and square chip cutting is adopted to replace long-strip-shaped chip cutting, so that the maximum heat flux density, heat resistance and temperature gradient of the light source are greatly improved, and the requirement (the minimum temperature needs to be higher than 10° C.) on refrigeration is reduced. In daily use, natural heat dissipation can be used, and refrigeration below ambient temperature is unnecessary. Meanwhile, fatigue damage to welding caused by thermal stress during long-pulse-width repeated frequency working is reduced, the reliability of the light source is improved, and the service life of the light source is prolonged.

It needs to be noted that for those skilled in the art, obviously the present disclosure is not limited to the details of the exemplary embodiment, and the present disclosure can be achieved in other specific forms without departing from the spirit or essential characteristics of the present disclosure. Therefore, for every point, the embodiments should be regarded as exemplary embodiments and are unrestrictive, the scope of the present disclosure is restricted by the claims appended hereto, therefore, all changes, including the meanings and scopes of equivalent elements, of the claims are aimed to be included in the present disclosure, and any mark of attached figures in the claims should not be regarded as limitation to the involved claims.

Specific examples are used for illustration of the principles and implementation methods of the present disclosure. The description of the above-mentioned embodiments is used to help illustrate the method and its core principles of the present disclosure. In addition, those skilled in the art can make various modifications in terms of specific embodiments and scope of application in accordance with the teachings of the present disclosure. In conclusion, the content of this specification shall not be construed as a limitation to the present disclosure.

What is claimed is:

1. A light source module comprising:

a base having a channel formed in a back surface of the base, and cooling water included in the channel;

a sealing ring provided adjacent to the channel;

a rear plate coupled to the back surface of the base, such that the sealing ring is compressed between the rear plate and the base to seal the channel;

an LED chip board coupled to a front surface of the base, and comprising a plurality of LED chips;

a wire plate configured to be connected to a power source;

a positive electrode and a negative electrode, each electrode having respective front ends connected with the LED chip board, and respective rear ends connected to the wire plate; and a window coupled to the front surface of the base and configured to cover the LED chip board.

2. The light source module according to claim 1, wherein the base is made of copper and gold-plated materials.

3. The light source module according to claim 1, wherein the channel has a generally S-shape with a plurality of concave portions.

4. The light source module according to claim 1, wherein the LED chip board includes a substrate made of beryllium oxide ceramic coated with an artificial diamond film, and the substrate is a heat sink.

5. The light source module according to claim 1, wherein the window is made of glass and fixed to the base by an adhesive.

6. The light source module according to claim 1, wherein the base further includes an air suction and filling hole, is configured to be used for connecting air suction equipment and pumping out air in a cavity defined between the base and the window, and the air suction and filling hole is further configured to inject a gas into the cavity between the base and the window.

7. The light source module according to claim 1, the base defining a front opening, wherein each of the plurality of LED chips is a square chip, the LED chip board includes a plurality of gold wires welded in series, and the shape of the LED chip board is matched with that of the front opening of the base.

8. The light source module according to claim 1, wherein the base further includes an air suction hole configured to be used for connecting air suction equipment and pumping out air in a cavity defined between the base and the window; and an air filling hole, wherein the air suction hole and the air filling hole are configured to be sealed after the base is evacuated of air.

9. The light source module according to claim 8, wherein the air filling hole is configured to inject a gas into the cavity between the base and the window; and to be sealed after the cavity is filled.

10. The light source module according to claim 1, wherein each of the plurality of LED chips is welded in series.

11. The light source module according to claim 10, wherein each of the plurality of LED chips is welded in series using gold wires.

* * * * *